(12) United States Patent
Majumder et al.

(10) Patent No.: US 10,142,212 B2
(45) Date of Patent: Nov. 27, 2018

(54) ON DEMAND PACKET TRAFFIC MONITORING FOR NETWORK PACKET COMMUNICATIONS WITHIN VIRTUAL PROCESSING ENVIRONMENTS

(71) Applicant: IXIA, Calabasas, CA (US)

(72) Inventors: Anirban Majumder, San Ramon, CA (US); Marcel Desdier, Pleasanton, CA (US); Deepesh Arora, Austin, TX (US)

(73) Assignee: Keysight Technologies Singapore (Holdings) Pte Ltd, Singapore (SG)

( * ) Notice: Subject to any disclaimer, the term of this patent is extended or adjusted under 35 U.S.C. 154(b) by 83 days.

(21) Appl. No.: 14/922,391

(22) Filed: Oct. 26, 2015

(65) Prior Publication Data

US 2017/0118102 A1    Apr. 27, 2017

(51) Int. Cl.
| | |
|---|---|
| *H04L 29/06* | (2006.01) |
| *H04L 12/24* | (2006.01) |
| *H04L 12/26* | (2006.01) |
| *G06F 9/455* | (2018.01) |

(52) U.S. Cl.
CPC ...... *H04L 43/0894* (2013.01); *G06F 9/45533* (2013.01); *G06F 9/45558* (2013.01); *H04L 43/12* (2013.01); *G06F 2009/45591* (2013.01); *G06F 2009/45595* (2013.01); *H04L 43/026* (2013.01); *H04L 43/04* (2013.01)

(58) Field of Classification Search
CPC ... H04L 12/2602; H04L 43/00; H04L 43/026; H04L 43/106; H04L 43/16; H04L 43/18; H04L 63/1408; H04L 63/1425; H04L 63/145; H04L 63/1458; H04L 2463/144
See application file for complete search history.

(56) References Cited

U.S. PATENT DOCUMENTS

| | | | |
|---|---|---|---|
| 5,515,376 | A | 5/1996 | Murthy et al. |
| 6,321,259 | B1 | 11/2001 | Oullette et al. |
| 6,578,147 | B1 | 6/2003 | Shanklin et al. |

(Continued)

OTHER PUBLICATIONS

S. Edwards, "Vulnerabilities of Network Intrusion Detection Systems: Realizing and Overcoming the Risks; The Case for Flow Mirroring," Top Layer Networks, Inc., May 1, 2002.

(Continued)

*Primary Examiner* — Alpus Hsu

(57) ABSTRACT

Systems and methods are disclosed to provide on demand packet traffic monitoring for packet communications within virtual packet processing environments. Virtual TAPs (test access ports) within virtualization layers for VM (virtual machine) host hardware systems are controlled by external controllers to configure watch filters for VM platforms operating within the virtualization layer based upon trigger events determined within packet flow data and/or based upon other external trigger events. The virtual TAP controller then periodically receives watch filter packet data updates from the virtual TAP and further controls the virtual TAP to configure more detailed focus filters for the VM platforms based upon watch filter trigger events. The virtual TAP controller can further communicate one or more VM action commands (e.g., stop VM, stop application, etc.) to the virtual TAP for application to the VM platforms based upon trigger events associated with this more detailed focus filter data.

26 Claims, 6 Drawing Sheets

(56) References Cited

U.S. PATENT DOCUMENTS

| | | |
|---|---|---|
| 6,785,286 B1 | 8/2004 | O'Keeffe et al. |
| 6,839,349 B2 | 1/2005 | Ambe et al. |
| 6,853,623 B2 | 2/2005 | Nederveen et al. |
| 6,901,517 B1 | 5/2005 | Redmore |
| 6,920,112 B1 | 7/2005 | McCloghrie et al. |
| 6,954,775 B1 | 10/2005 | Shanklin et al. |
| 6,996,779 B2 | 2/2006 | Meandzija et al. |
| 7,016,980 B1 | 3/2006 | Mayer et al. |
| 7,027,437 B1 | 4/2006 | Merchant et al. |
| 7,142,518 B2 | 11/2006 | Mitchell |
| 7,143,196 B2 | 11/2006 | Rimmer et al. |
| 7,254,114 B1 | 4/2007 | Turner et al. |
| 7,245,620 B2 | 7/2007 | Shankar |
| 7,310,306 B1 | 12/2007 | Cheriton |
| 7,424,018 B2 | 9/2008 | Gallatin et al. |
| 7,554,984 B2 | 6/2009 | Kalkunte et al. |
| 7,688,727 B1 | 3/2010 | Ferguson et al. |
| 7,769,873 B1 | 8/2010 | Mackie |
| 7,889,711 B1 | 2/2011 | Minei et al. |
| 7,917,647 B2 | 3/2011 | Cooper et al. |
| 8,018,943 B1 | 9/2011 | Pleshek et al. |
| 8,098,677 B1 | 1/2012 | Pleshek et al. |
| 8,200,203 B1 | 6/2012 | Christensen et al. |
| 8,250,641 B2* | 8/2012 | Morgan ............ H04L 63/0227 726/11 |
| 8,447,718 B2 | 5/2013 | Norton et al. |
| 8,479,276 B1* | 7/2013 | Vaystikh ............ G06F 21/577 713/160 |
| 8,732,182 B2* | 5/2014 | Bethlehem ......... H04L 12/2863 707/694 |
| 8,842,548 B2 | 9/2014 | Pleshek et al. |
| 8,893,274 B2* | 11/2014 | Zhu .................... H04L 63/0227 718/1 |
| 8,902,895 B2 | 12/2014 | Pleshek et al. |
| 8,934,495 B1 | 1/2015 | Hilton et al. |
| 9,110,703 B2 | 8/2015 | Santos et al. |
| 9,647,909 B2* | 5/2017 | Kuan ................. H04L 43/0817 |
| 9,680,728 B2 | 6/2017 | Besser |
| 9,800,482 B2* | 10/2017 | Pandey .............. H04L 43/087 |
| 9,935,854 B2* | 4/2018 | Kuan .................. H04L 43/065 |
| 9,961,105 B2* | 5/2018 | Nanda ................ H04L 43/062 |
| 9,971,619 B2* | 5/2018 | Karnes .................. H04L 43/12 |
| 2001/0022786 A1 | 9/2001 | King et al. |
| 2001/0055274 A1 | 12/2001 | Hegge et al. |
| 2002/0186259 A1 | 12/2002 | Meandzija et al. |
| 2003/0046657 A1 | 3/2003 | White |
| 2003/0074421 A1 | 4/2003 | Kusano et al. |
| 2004/0003094 A1 | 1/2004 | See |
| 2004/0042470 A1 | 3/2004 | Cooper et al. |
| 2004/0103321 A1 | 5/2004 | Wesinger, Jr. et al. |
| 2004/0107361 A1 | 6/2004 | Redan et al. |
| 2004/0196841 A1 | 10/2004 | Tüdor et al. |
| 2005/0053073 A1 | 3/2005 | Kloth et al. |
| 2005/0060402 A1 | 3/2005 | Oyadomari et al. |
| 2005/0125195 A1 | 6/2005 | Brendel |
| 2005/0182950 A1 | 8/2005 | Son et al. |
| 2006/0256788 A1 | 11/2006 | Donahue |
| 2008/0008202 A1 | 1/2008 | Terrell et al. |
| 2008/0072292 A1 | 3/2008 | Narjala |
| 2008/0222731 A1 | 9/2008 | Dowd et al. |
| 2009/0007021 A1 | 1/2009 | Hayton |
| 2009/0013052 A1 | 1/2009 | Robarts et al. |
| 2009/0150996 A1 | 6/2009 | Haswell |
| 2009/0172148 A1 | 7/2009 | Underwood |
| 2009/0172817 A1* | 7/2009 | Sedayao ............... G06F 21/566 726/25 |
| 2009/0254990 A1* | 10/2009 | McGee .................. G06F 21/51 726/22 |
| 2009/0327903 A1 | 12/2009 | Smith et al. |
| 2010/0027554 A1 | 2/2010 | Kuthan et al. |
| 2010/0107162 A1* | 4/2010 | Edwards ............... G06F 9/5077 718/1 |
| 2010/0332618 A1 | 12/2010 | Norton et al. |
| 2011/0004698 A1 | 1/2011 | Wu |
| 2011/0317694 A1 | 12/2011 | Pleshek et al. |
| 2012/0079107 A1 | 3/2012 | Williams et al. |
| 2012/0106354 A1 | 5/2012 | Pleshek et al. |
| 2013/0031233 A1 | 1/2013 | Feng et al. |
| 2013/0291109 A1 | 10/2013 | Staniford et al. |
| 2014/0157407 A1 | 6/2014 | Krishnan et al. |
| 2014/0229605 A1 | 8/2014 | Besser |
| 2015/0263889 A1 | 9/2015 | Newton |
| 2015/0319030 A1 | 11/2015 | Nachum |
| 2016/0087861 A1* | 3/2016 | Kuan .................... H04L 43/065 709/224 |
| 2016/0094418 A1* | 3/2016 | Raney ................... H04L 43/028 370/241 |
| 2016/0110211 A1* | 4/2016 | Karnes ................ G06F 9/45558 718/1 |
| 2016/0149788 A1* | 5/2016 | Zhang .................... H04L 43/10 709/224 |
| 2016/0226726 A1* | 8/2016 | Rao ........................ H04L 43/028 |
| 2017/0099195 A1* | 4/2017 | Raney ................... H04L 43/028 |
| 2017/0163510 A1 | 6/2017 | Arora et al. |

OTHER PUBLICATIONS

A. Esson and J. Mannos, "Broadcom BCM5600 StrataSwitch; A Highly Integrated Ethernet Switch on a Chip," Broadcom Corporation, Hot Chips Aug. 17, 1999.

J. Magee, "The Case for IDS Balancing vs. a Switch," Top Layer Networks, Inc., May 2003.

G. Marshall, SC Magazine Reprint, "Attack Mitigator," Aug. 2002.

F. Muhtar, "Appliances to Boost Network Defence," CyberSecurity Malaysia, Nov. 26, 2001.

National Information Assurance Partnership, "Common Criteria Evaluation and Validation Scheme, Validation Report; Top Layer Networks; IDS BalancerTM Version 2.2 Appliance (IDSB3531-CCV1.0, IDSB3532-CCV1.0, IDSB4508-CCV1.0)," Report No. CCEVS-VR-04-0074, National Institute of Standards and Technology; National Security Agency, Sep. 3, 2004.

Radware, "Radware's Smart IDS Management; FireProof and Intrusion Detection Systems; Deployment and ROI," North America Radware, Inc.; International Radware, Ltd., Aug. 21, 2002.

SC Magazine Reprint, "IDS Balancer 3500 Appliance," Jul. 2002.

Top Layer Networks, Inc., "Top Layer Advances Scaleable Intrusion Detection With Industry Leading Multi-Gigabit Offering," Press Release, Mar. 10, 2003.

Top Layer Networks, Inc., "Product Enhancements Optimize Existing Network Intrusion Detection and Prevention Environments," Press Release, Aug. 18, 2003.

Top Layer Networks, Inc., "Case Study—IDS Balancer; Building an Intelligent Monitoring Layer Using the Top Layer IDS Balancer Ensures Full Security Coverage for University of California, Irvine," www.TopLayer.com; 2003.

Top Layer Networks, Inc., "IDS Balancer 3.0 Delivers Ultimate Flexibility in Selecting, Filtering and Distributing Network Traffic," Press Release, Oct. 20, 2004.

Top Layer Networks, Inc., "IDS Balancer; Aggregation, Filtering, & Load Appliance," internet advertisement, www.TopLayer.com., 2004.

Top Layer Networks, Inc., "APP Switch 2500; The Original Top Layer Device to Perfect the Art of Network Security," internet advertisement, www.TopLayer.com. 2001.

Kristopher Raney, "Selective Scanning of Network Packet Traffic Using Cloud-Based Virtual Machine Tool Platforms," U.S. Appl. No. 14/501,717, filed Sep. 30, 2014.

Ixia, "A Paradigm Shift for Network Visibility: Delivering Better Data for Better Decisions", Rev. A. May 2014, 14 pgs.

Ixia, "Ixia Application and Threat Intelligence Processor", Data Sheet, May 2014, 3 pgs.

Ixia, "Ixia xFilter", Data Sheet, May 2015, 5 pgs.

Search Report and Written Opinion; PCT/US2016/055984, dated Dec. 15, 2016; 15 pgs.

Hofstede et al., "Flow Monitoring Explained: From Packet Capture to Data Analysis With NetFlow and IPFIX", IEEE, May 2014, 33 pgs.

(56) References Cited

OTHER PUBLICATIONS

Ixia, Ixia Phantom vTap With TapFlow Filtering, Data Sheet, 4 pgs. (Jul. 2015).
Ixia, Ixia Flex Tap, Data Sheet, 5 pgs. (Oct. 2015).

* cited by examiner

ON DEMAND PACKET TRAFFIC MONITORING FOR NETWORK PACKET COMMUNICATIONS WITHIN VIRTUAL PROCESSING ENVIRONMENTS

TECHNICAL FIELD OF THE INVENTION

This invention relates to monitoring packet flows for packet forwarding systems and, more particularly, to monitoring such packet flows within virtual processing environments.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), and/or switched port analyzer (SPAN) ports available on network switch systems.

To help alleviate the problem of limited access to network packets for monitoring, tool aggregation devices or packet broker devices have also been developed that allow shared access to the monitored network packets. In part, these network packet broker devices allow users to obtain packets from one or more network monitoring points (e.g., network hubs, TAPs, SPAN ports, etc.) and to forward them to different monitoring tools. Network packet brokers can be implemented as one or more packet processing systems in hardware and/or software that provide access and visibility to multiple monitoring tools. These network packet brokers can also aggregate monitored traffic from multiple source links and can load balance traffic of interest to various tools. The traffic of interest can be network packets that are selected by the packet brokers through packet filters and related packet forwarding rules that identify particular packets or packet flows from within the monitored network traffic as traffic of interest.

Network packet analysis tools include a wide variety of devices that analyze packet traffic, including traffic monitoring devices, packet sniffers, data recorders, voice-over-IP monitors, intrusion detection systems, network security systems, application monitors and/or any other network tool device or system. Network analysis tools, such as traffic analyzers, are used within packet-based data networks to determine details about the network packet traffic flows within the packet communication network infrastructure. For example, certain network traffic analyzers identify software applications being used and executed by devices operating within the packet communication network infrastructure, track user activity within the network infrastructure, identify possible security threats to the network infrastructure and its network-connected devices, and/or make other determinations based upon an analysis of the network packet traffic and/or the contents of the data packets being communicated within the network infrastructure. Application and threat intelligence processors (ATIPs), for example, are network traffic analyzers that are used to determinate applications operating within the network infrastructure and to identify potential threats to the network infrastructure. Network traffic analyzers, including application and threat intelligence processors (ATIPs), can be included as part of a network tool optimizer device or other tool aggregation device, and the resulting traffic analysis can be used to provide traffic information concerning the nature of network traffic to external devices and systems.

Certain network communication systems also include virtual processing environments that include virtual machine (VM) platforms hosted by one or more processing devices within a VM host hardware system. For example, network cloud resources made available to network-connected systems are often virtualized such that processors or processing cores associated with a server processing platform (e.g., server blade) and/or combinations of such server processing platforms are used to provide software processing instances or virtual machine platforms within cloud server processing systems. A virtual machine (VM) platform is an emulation of a processing system or application that is initialized and operated within virtualization layer software being executed on a VM host hardware system. By operating multiple VM platforms within such a virtualization layer or hypervisor also operating on VM host hardware system, a variety of processing resources can efficiently be provided internally to the virtual processing environment and/or externally to other processing systems and devices.

When a network to be monitored includes a virtual processing environment, however, difficulties arise in utilizing prior tool aggregation devices as such virtual processing environments can be relatively contained and internal packet communication bandwidths can be very large. For example, it is often difficult to provide external visibility to packet traffic being communicated among virtual machine (VM) platforms within a VM host hardware system. This virtual packet traffic often remains inside the virtualization layer for the VM host hardware system, and traffic bandwidths are often relatively unlimited as compared to packet communication bandwidths available outside the virtualization layer for the VM host hardware system, for example, with respect to external network communication paths.

One prior solution to this external visibility problem for packet traffic within a VM host system is for very limited packet flow information to be collected and output based upon packets being communicated to and from VM platforms within the virtualization layer. This limited flow information, however, is often too limited to provide desired visibility into the details of the network traffic and potential threats to the network. Other solutions send complete copies of the network packets within virtual packet flows to external monitoring tools, for example, using a virtual switch and a virtual TAP within the virtualization layer. The external monitoring tools can then apply post-collection packet analysis. However, as the overall throughput bandwidth for the virtual packet traffic within the virtualization layer is not limited by physical hardware drivers, this throughput can become very high. As such, forwarding copies of this traffic to external monitoring tools through network hardware drivers for the VM host hardware system often overwhelms the capabilities of the VM host hardware system. Further prior solutions provide some static filtering to the virtual packet traffic within the virtualization layer to limit the external bandwidth requirements. This static filtered traffic, however, can still overwhelm hardware drivers for the VM host hardware system or related network infrastructure and can unnecessarily waste network bandwidth where no threats are present.

SUMMARY OF THE INVENTION

Systems and methods are disclosed to provide on demand packet traffic monitoring for packet communications within virtual packet processing environments. For disclosed embodiments, a virtual test access port (TAP) within a virtualization layer for a virtual machine (VM) host hardware system is controlled by an external virtual TAP controller (e.g., standalone controller, controller VM platform, controller application, and/or other controller implementation) to configure dynamic watch filters for VM platforms operating within the virtualization layer based upon trigger events. The trigger events, for example, can be determined from packet flow summary data being periodically reported by the virtual TAP to the virtual TAP controller and/or can be based upon other external trigger events (e.g., network vulnerabilities or threats detected for network components apart from the VM platforms). The virtual TAP controller then periodically receives watch packet data updates from the virtual TAP based upon the watch filters and can further control the virtual TAP to configure more detailed focus filters for the VM platforms operating within the virtualization layer based upon trigger events determined within the watch packet data. The virtual TAP then periodically reports focus packet data based upon the focus filters, and the virtual TAP controller can further communicate one or more VM action commands to the virtual TAP for application to the VM platforms based upon trigger events associated with this more detailed focus packet data. These VM action commands can include a variety of actions including commands to stop or modify the operations of the VM platforms. Other features and variations can be implemented, if desired, and related systems and methods can be utilized, as well.

For one embodiment, a method for on demand packet traffic monitoring is disclosed. At an external controller coupled to a network, the method includes generating watch filter rules in response to an occurrence of a first trigger event, and transmitting the watch filter rules through the network to a virtual test access port (TAP) operating within a virtual processing environment coupled to the network. At the virtual TAP, the method includes receiving the watch filter rules from the external controller, using the watch filter rules to configure a watch filter associated with one or more packet flows being communicated between two or more virtual machine (VM) platforms operating within the virtual processing environment, generating watch packet data associated with at least one of the VM platforms using the watch filter, and periodically transmitting the watch packet data to the external controller through a network that is external to the virtual processing environment. In additional embodiments, the external controller includes at least one of a stand-alone device, a VM platform operating within a virtual processing environment, or a controller application operating within a VM platform within a virtual processing environment.

In further embodiments, the first trigger event is an event detected from packet data associated with the one or more packet flows. In other embodiments, the first trigger event is an external event not detected from packet data associated with the one or more packet flows. In still further embodiments, the first trigger event includes at least one of an indication of a network threat, an indication of a network intrusion, or an indication of a network vulnerability. In additional embodiments, the watch packet data includes detailed packet traffic statistics for applications operating within at least one of the VM platforms.

In further embodiments, at the virtual TAP, the method also includes generating packet flow summary data associated with the one or more packet flows, and periodically transmitting the packet flow summary data to the external controller through the network. And at the external controller, the method also includes receiving the packet flow summary data, and monitoring the packet flow summary data to determine occurrence of the first trigger event. In still further embodiments, the packet flow summary data includes aggregated packet traffic statistics for the one or more packet flows.

In further embodiments, at the external controller, the method also includes monitoring the watch packet data to determine when a second trigger event occurs with respect to the watch packet data, generating focus filter rules in response to an occurrence of the second trigger event, and transmitting the focus filter rules to the virtual TAP through the network. And at the virtual TAP, the method also includes receiving focus filter rules from the external controller, using the focus filters rules to configure a focus filter associated with the one or more packet flows, generating focus packet data using the focus filter, and periodically transmitting the focus packet data to the external controller through the network. In still further embodiments, the focus packet data includes at least one of packet content data or packet meta data for packets within the one or more packet flows. In additional embodiments, the method also includes displaying representations of the packet flow summary data, the watch packet data, and the focus packet data through a graphical user interface; and the method also includes allowing user selection of one or more parameters for the watch filter and the focus filter.

In further embodiments, at the external controller, the method also includes monitoring the focus packet data to determine when a third trigger event occurs with respect to the focus packet data, generating one or more commands associated with the one or more packet flows in response to an occurrence of the third trigger event, and transmitting the one or more commands to the virtual processing environment. In still further embodiments, the one or more commands include a command to terminate operation of one or more of the VM platforms operating within the virtual processing environment.

For another embodiment, a system for on demand packet traffic monitoring is disclosed including a virtual test access port (TAP) configured to operate within a virtual processing environment, two or more virtual machine (VM) platforms configured to operate within the virtual processing environment, and an external controller configured to communicate with the virtual TAP through a network that is external to the virtual processing environment. The external controller is further configured to generate watch filter rules in response to an occurrence of a first trigger event and to transmit the watch filter rules to the virtual TAP through the network. And the virtual TAP is further configured to receive the watch filter rules from the external controller, to use the watch filter rules to configure a watch filter associated with one or more packet flows, to generate watch packet data associated with at least one of the VM platforms using the watch filter, and to periodically transmit the watch packet data to the external controller through a network. In additional embodiments, the external controller includes at least one of a stand-alone device, a VM platform operating within a virtual processing environment, or a controller application operating within a VM platform within a virtual processing environment.

In further embodiments, the first trigger event is an event detected from packet data associated with the one or more packet flows. In other embodiments, the first trigger event is an external event not detected from packet data associated with the one or more packet flows. In still further embodiments, the first trigger event includes at least one of an indication of a network threat, an indication of a network intrusion, or an indication of a network vulnerability. In additional embodiments, the watch packet data includes detailed packet traffic statistics for applications operating within at least one of the VM platforms.

In further embodiments, the virtual TAP is further configured to generate packet flow summary data associated with the one or more packet flows and to periodically transmit the packet flow summary data to the external controller through the network, and the external controller is further configured to receive the packet flow summary data and to monitor the packet flow summary data to determine occurrence of the first trigger event. In still further embodiments, the packet flow summary data includes aggregated packet traffic statistics for the one or more packet flows.

In further embodiments, the external controller is further configured to monitor the watch packet data to determine when a second trigger event occurs with respect to the watch packet data, to generate focus filter rules in response to an occurrence of the second trigger event, and to transmit the focus filter rules to the virtual TAP. And the virtual TAP is further configured to receive the focus filter rules from the external controller, to use the focus filters rules to configure a focus filter associated with the one or more packet flows, to generate focus packet data using the second filter, and to periodically transmit the focus packet data to the external controller through the network. In still further embodiments, the focus packet data includes at least one of packet content data or packet meta data for packets within the one or more packet flows. In additional embodiments, the external controller is further configured to display representations of the packet flow data, the first packet data, and the second packet data through a graphical user interface and to allow user selection of one or more parameters for the watch filter and the focus filter.

In further embodiments, the external controller is further configured to monitor the focus packet data to determine when a third trigger event occurs with respect to the focus packet data, to generate one or more commands associated with the one or more packet flows in response to an occurrence of the third trigger event, and to transmit one or more commands associated to the virtual processing environment. In still further embodiments, the one or more commands includes a command to terminate operation of one or more of the VM platforms operating within the virtual processing environment.

Different or additional features, variations, and embodiments can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Systems and methods are disclosed to provide on demand packet traffic monitoring for packet communications within virtual packet processing environments. For disclosed embodiments, a virtual test access port (TAP) within a virtualization layer for a virtual machine (VM) host hardware system is controlled by an external virtual TAP controller (e.g., standalone controller, controller VM platform, controller application, and/or other controller implementation) to configure dynamic watch filters for VM platforms operating within the virtualization layer based upon trigger events. The trigger events, for example, can be determined from packet flow summary data being periodically reported by the virtual TAP to the virtual TAP controller and/or can be based upon other external trigger events (e.g., network vulnerabilities or threats detected for network components apart from the VM platforms). The virtual TAP controller then periodically receives watch packet data updates from the virtual TAP based upon the watch filters and can further control the virtual TAP to configure more detailed focus filters for the VM platforms operating within the virtualization layer based upon trigger events determined within the watch packet data. The virtual TAP then periodically reports focus packet data based upon the focus filters, and the virtual TAP controller can further communicate one or more VM action commands to the virtual TAP for application to the VM platforms based upon trigger events associated with this more detailed focus packet data. These VM action commands can include a variety of actions including commands to stop or modify the operations of the VM platforms. Different features and variations can be implemented, as desired, and related systems and methods can be utilized, as well.

In operation, the disclosed embodiments provide on demand packet traffic monitoring for virtual packet processing environments through virtual TAPs that apply dynamic filtering to packet traffic associated with VM platforms operating within a virtualization layer for a VM host hardware system. Based upon trigger events, the virtual TAP controller communicates with the virtual TAP to receive additional detailed information concerning packet traffic for particular VM platforms through dynamic watch/focus filters implemented by the virtual TAP based upon filter rules communicated by the virtual TAP controller. By providing on demand packet traffic monitoring based upon dynamic watch/focus filters, the disclosed embodiments advantageously use less network bandwidth, reduce unnecessary use of network bandwidth where threats are not present, allow configurable control through management platforms, allow for information collected and reported to be dynamically configured through dynamic filters and related filter rules, and/or provide other desirable operational features.

Figure 1:
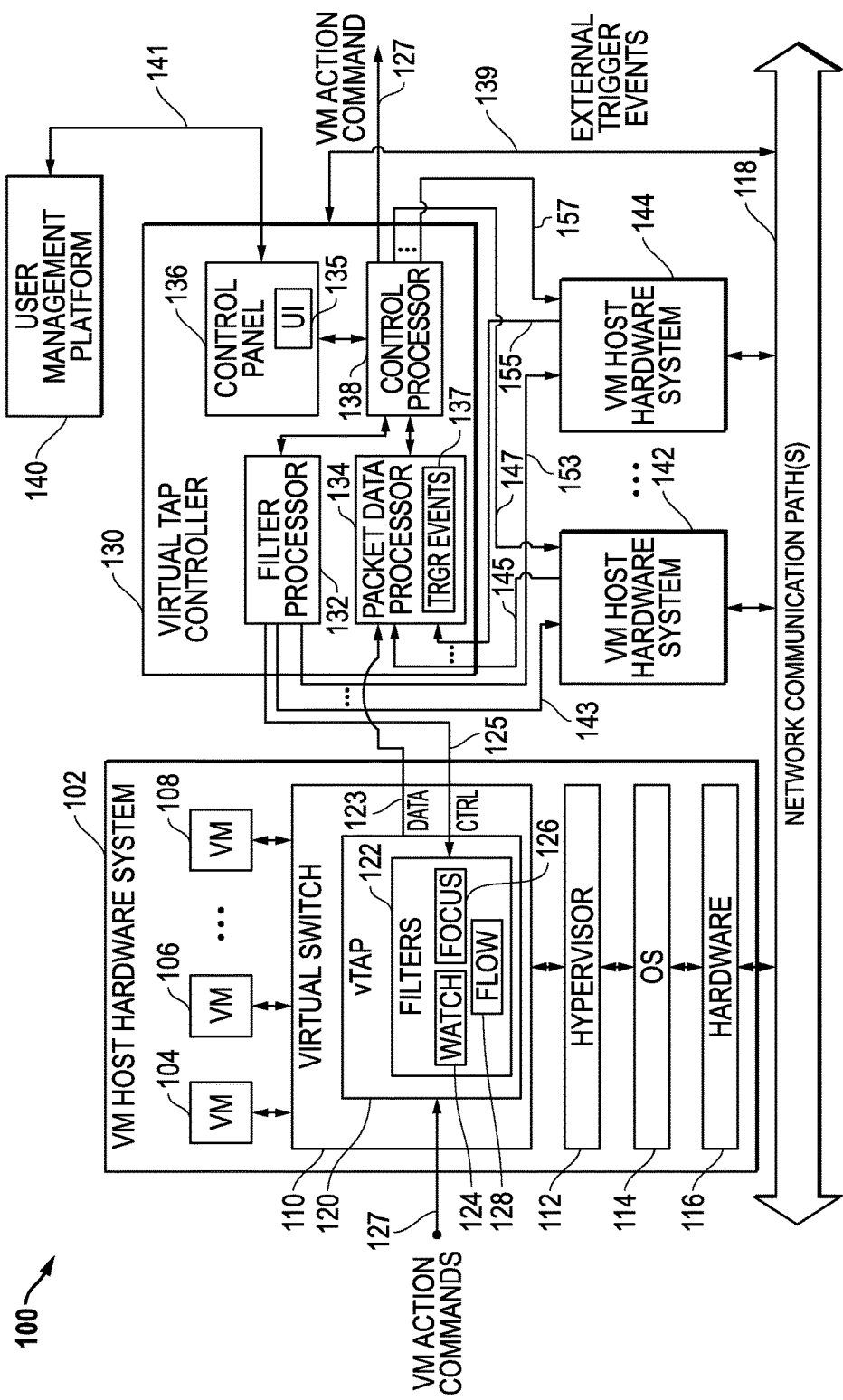
FIG. 1 is a block diagram of an example embodiment for a virtual test access port (TAP) controller configured to control virtual TAPs within one or more virtual machine (VM) host hardware systems to provide on demand packet traffic monitoring for virtual packet processing environments.

FIG. 1 is a block diagram of an example embodiment 100 for a virtual TAP controller 130 configured to control virtual TAPs 120 within one or more VM host hardware systems 102, 142, . . . 144. The VM host hardware systems 102, 142, . . . 144 are configured to communicate network packets through one or more external network communication paths 118. The external network communication paths 118 can be wired network communication paths, wireless network communication paths, or a combination of wired and wireless communication paths, and the external network communication paths 118 can include one or more intervening network communication devices or systems within a network communication infrastructure. As represented by VM host hardware system 102, each of the VM host hardware systems 102, 142, . . . 144 include a plurality of virtual machine (VM) platforms 104, 106, . . . 108 that operate within a virtualization layer, such as a virtualization layer formed by hypervisor 112. The hypervisor 112 operates on top of an operating system (OS) 114 which in turn is operating on computer hardware 116. The computer hardware 116 is coupled to communicate with the network communication paths 118, for example, through one or more network interface cards and/or other network connections. The VM platforms 104, 106, . . . 108 can be configured to operate in part to provide one or more network related applications that communicate packets through the external network communication paths 118. Further, the VM platforms 104, 106, . . . 108 communicate with each other and to the external network communication paths 118 through a virtual switch 110 operating within the virtualization layer 112.

According to the embodiments described herein, a virtual TAP 120 operates as part of the virtual switch 110 to monitor packet traffic traversing the virtual switch 110 using dynamic filters 122. The dynamic filters 122 include configurable watch filters 124 and configurable focus filters 126 along with packet flow filters 128, which can also be configurable if desired. The virtual TAP controller 130 in part controls the operation of virtual TAP 120 and includes filter processor 132, packet data processor 134, and control processor 138. The packet data processor 134 receives packet traffic data from the virtual TAP 120 through filter data communications 123 and analyzes this packet traffic data to identify various trigger events 137. The virtual TAP controller 130 can also receive indications of external trigger events through network communications 139 from the network communication paths 118. The filter processor 132 in part controls the operation of the virtual TAP 120 within VM host hardware system 102 through filter control communications 125. The control processor 138 is configured to facilitate operations of the virtual TAP controller 130 and in part generates and applies VM action commands through communications 127 to the virtual TAP 120 within the virtual processing environment provided by VM host hardware system 102. As described herein, these VM action commands are then used to control in part the VM platforms 104, 106, . . . 108 operating within the VM host hardware system 102.

The VM host hardware systems 142 and 144 can include similar components as shown for VM host hardware system 102 and can similarly receive filter control communications 143/153 from the virtual TAP controller 130, transmit filter data communications 145/155 to the virtual TAP controller 130, and receive VM action command communications 147/157 from the virtual TAP controller 130. It is noted that the VM action commands within communications 127/147/157 can include a variety of actions such as a stop VM command, a modify VM command, a generate warning command, and/or any other desired action associated with the VM platforms and/or their respective packet flows.

The virtual TAP controller 130 can also include a control panel 136 that is coupled to communicate through communications 141 with a management platform 140 to allow user configuration of one or more operational parameters associated with the virtual TAP 120 including the dynamic filters 122. For example, the control panel 136 can provide a user interface (UI) 135, such as a graphical user interface (GUI), that can be used by the management platform 140 to configure, manage, and/or otherwise control the operation of the virtual TAP controller 130 which in turn configures, manages, and/or otherwise controls the virtual TAPs 120 within the VM host hardware systems 102, 142, . . . 144. As one further example, the VM control action commands for control command communications 127/147/157 can be configured through the management platform 140. As another further example, the frequency or time periods for the periodic packet data updates can be user configurable through the management platform 140 and the user interface 135 provided by the control panel 136 within the virtual TAP controller 130. Other variations could also be implemented.

In operation, the packet flow filters 128 are initially configured to provide periodic summary updates concerning packet flow data to the virtual TAP controller 130 through filter data communications 123. For example, this summary packet flow data can include numbers of receive (RX) packets and transmit (TX) packets for VM platforms and associated applications that is collected and reported as the summary packet flow data. Based upon trigger events within this summary packet flow data and/or from other external trigger events, the virtual TAP controller 130 instructs the virtual TAP 120 to dynamically configure watch filters 124 through filter control communications 125 to provide periodic updates concerning packet watch data (e.g., application level RX/TX packet data) to the virtual TAP controller 130 through filter data communications 123. Based upon trigger events within the packet watch data and/or from other external trigger events, virtual TAP controller 130 can also instruct the virtual TAP 120 to dynamically configure additional focus filters 126 through filter control communications 125 to provide periodic updates concerning packet focus data (e.g., detailed packet content and/or packet meta data information) to the virtual TAP controller 130 through filter data communications 123. Based upon trigger events within the packet focus data and/or from other external trigger events, the virtual TAP controller 130 then generates and applies one or more different VM action commands to the VM platforms 104, 106, . . . 108 within the VM host hardware system 102 through communications 127 to the virtual TAP 120. The operation of VM host hardware systems 142 and 144 can be similarly controlled by the virtual TAP controller 130 through filter control communications 143/153, filter data communications 145/155, and VM action command communications 147/157.

It is noted that the trigger events based upon the packet flow summary data, the packet watch data, and/or the packet focus data can include one or more indications of network threats, vulnerabilities, intrusions, and/or events associated with the packet data and/or associated with other external trigger events. For example, a network threat can be indicated where packet data flows suddenly increase significantly in number of TX/RX packets being communicated within a packet flow. In addition, a network vulnerability or intrusion can be indicated where unexpected activity is detected with respect to the packet data or with respect to applications operating on a VM platform. Further, an indication of a network threat can arise externally from outside the VM host hardware systems 102, 142, . . . 144, and this external threat indication can be used as a trigger event. It is noted, therefore, that a wide variety of events detected with respect to the packet data can be used as trigger events and that a wide variety of external events can also be used as trigger events while still taking advantage of the on demand packet monitoring embodiments described herein.

It is noted that the filter data communications 123/143/153, the filter control communications 125/145/155, the VM action command communications 127/147/157, and/or the management communications 141 can use the external network communication paths 118 or can use one or more additional or different communication paths, which can further include wired, wireless, or wired and wireless network communications. It is also noted that the virtual TAP controller 130 can be a stand-alone packet monitoring control device, a server system operating as a packet monitoring control system, a VM platform operating within a virtualization layer to provide packet monitoring control, a controller application operating within a VM platform, and/or a combination any of these devices, systems, or platforms. The virtual TAP controller 130 can communicate through the network communication paths 118 and/or through other communication paths, as desired. Other variations could also be implemented.

It is also noted that the control panel 136 for the virtual TAP controller 130 can be implemented as a web interface that can be accessed through a network browser (e.g., MICROSOFT Internet Explorer or MOZILLA Firefox) by other network-connected processing systems. For example, the virtual TAP controller 130 can be configured to automatically download a control panel software application to the management platform 140 when a network browser operating on the management platform 140 connects to an IP address for the virtual TAP controller 130. This download can occur the first time the network browser connects, and the control panel 136 can then be stored locally by the management platform 140. The management platform 140 can be, for example, personal computer systems, server systems, and/or other processing systems running WINDOWS operating systems, LINUX operating systems, and/or other operating system as desired. In one embodiment, the control panel 136 can in part be downloaded as JAVA-based software code or modules. Other implementations could also be used.

Figure 2:
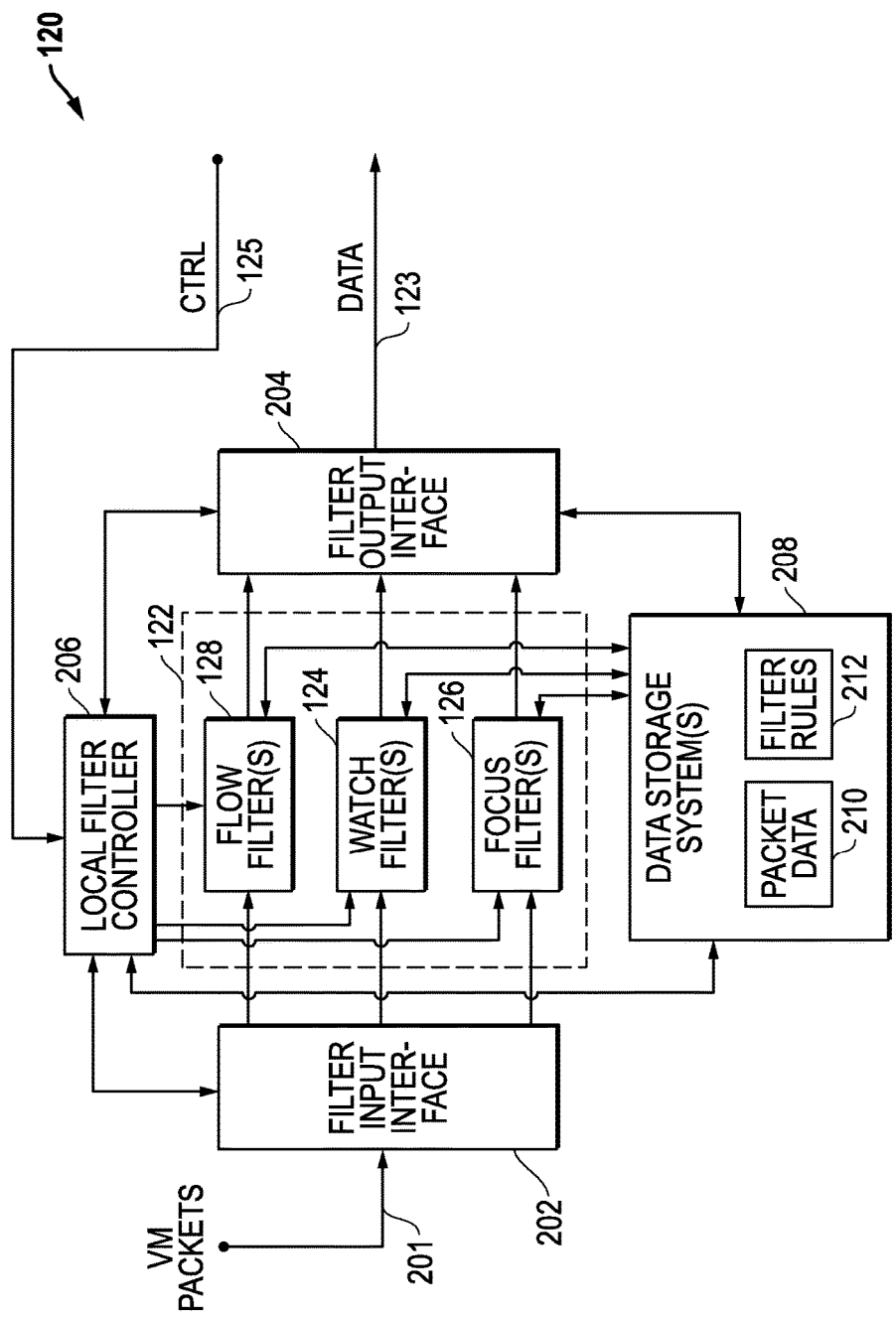
FIG. 2 is a block diagram of example components for a virtual TAP that provides on demand packet traffic monitoring for virtual packet processing environments.

FIG. 2 is a block diagram of example components for virtual TAP 120. Input VM packets 201 are acquired by the virtual TAP 120 by monitoring packets within network packet flows traversing the virtual switch 110, and these input VM packets 201 are then forwarded to filter input interface 202. The filter input interface 202, which can include one or more packet buffers, outputs packets to filters 122. As described herein, filters 122 can be dynamically controlled and configured by the virtual TAP controller 130 to include one or more flow filters 128, one or more watch filters 124, and/or one or more focus filters 126. Filter control communications 125 are received by a local filter controller 206 from the virtual TAP controller 130, and these filter control communications 125 include filter rules 212 that can be stored in one or more data storage systems 208. Based upon these filter control communications 125 and the filter rules 212, the local filter controller 206 dynamically configures one or more flow filters 128, watch filters 124, and/or focus filters 126 to operate as dynamic filters 122. These dynamic filters 122 are then used to process the input VM packets 201 received from the filter input interface 202 based upon packet filter parameters configured for the filters 122 based upon the filter rules 212. The filter output interface 204, which can include one or more data buffers, receives the output filter data from filters 122 and periodically sends filter data communications 123 to the virtual TAP controller 130. The filter output interface 204 can also receive data from the data storage systems 208 and communicate this data as part of the filter data communications 123 to the virtual TAP controller 130. In addition to filters 122, the local filter controller 206 is also coupled to the filter input interface 202, the filter output interface 204, and the data storage systems 208 to facilitate management, control, and operations of the components of the virtual TAP 120.

It is noted that each of the filters 122 can also store packet data 210 associated with its processing of the input VM packets 201 within the one or more data storage systems 208. This packet data 210 can include packet content data or packet meta data gathered and/or generated based upon the network packet communications being collected and monitored by the virtual TAP 120. Packet content data refers to data from the packets themselves and can include, for example, protocol headers, encapsulation headers, source identifiers (e.g., IP addresses), destination addresses (e.g., IP addresses), port information, payload data, and/or other content information from the input VM packets 201 including copies of the entire packets. Packet meta data refers to packet related data that is not data within the packets themselves but is data related to the packets. This packet meta data can include, for example, a variety of packet related information and/or packet flow related information such as session information, application type, geographic information, receive (RX) packet rates, transmit (TX) packet rates, and/or other information related to the input VM packets 201.

The filters 122 including the flow filters 128, the watch filters 124, and the focus filters 126 can rely upon various portions of the content of network packets to identify packets, collect data, determine traffic statistics, and/or take other actions with respect to the input VM packets 201 they receive. For example, filters 122 can be configured to rely upon data and/or information associated with any network layer header values or packet field contents to perform such actions. With respect to network layers, packet-based communications are often described in terms of seven communication layers under the ISO/OSI (International Standards Organization/Open Systems Interconnect) model: application layer (L7), presentation layer (L6), session layer (L5), transport layer (L4), network layer (L3), data link layer (L2), and physical layer (L1). Packet headers associated with any of these layers as well as packet data payload contents, therefore, can be used by the filters 122. For example, information pertinent to identifying a packet, such as source ID and destination ID and protocol type, is often found in one or more network layer headers. Packets also have various other identification fields and content information within them that may be matched and used to collect and aggregate information about packets and related packet flows. Thus, a wide variety of packet related data and information can be identified, collected, aggregated, and/or otherwise used by the filters 122.

It is noted that the data storage systems 208 can be implemented using one or more non-transitory tangible computer-readable mediums such as FLASH memory, random access memory, read only memory, programmable memory devices, reprogrammable storage devices, hard drives, floppy disks, DVDs, CD-ROMs, and/or any other non-transitory data storage mediums. It is also noted that the VM host hardware systems 102, 142, ... 144 as well as the virtual TAP controller 130 and the management platform 140 can be implemented using one or more processing devices configured to implement the functionality described. For example, one or more processing devices, such as a processor, microcontroller, configurable logic device (e.g., CPLD (complex programmable logic device), FPGA (field programmable gate array)), and/or other processing device, can be programmed to implement the functionality described herein. It is further noted that software or other programming instructions for such processing devices can be implemented as software or programming instructions embodied in one or more non-transitory computer-readable mediums (e.g., memory storage devices, FLASH memory, DRAM memory, reprogrammable storage devices, hard drives, floppy disks, DVDs, CD-ROMs, etc.) including software or programming instructions that when executed by the processing devices cause the processing devices to perform the processes, functions, and/or capabilities described herein.

Figure 3A:
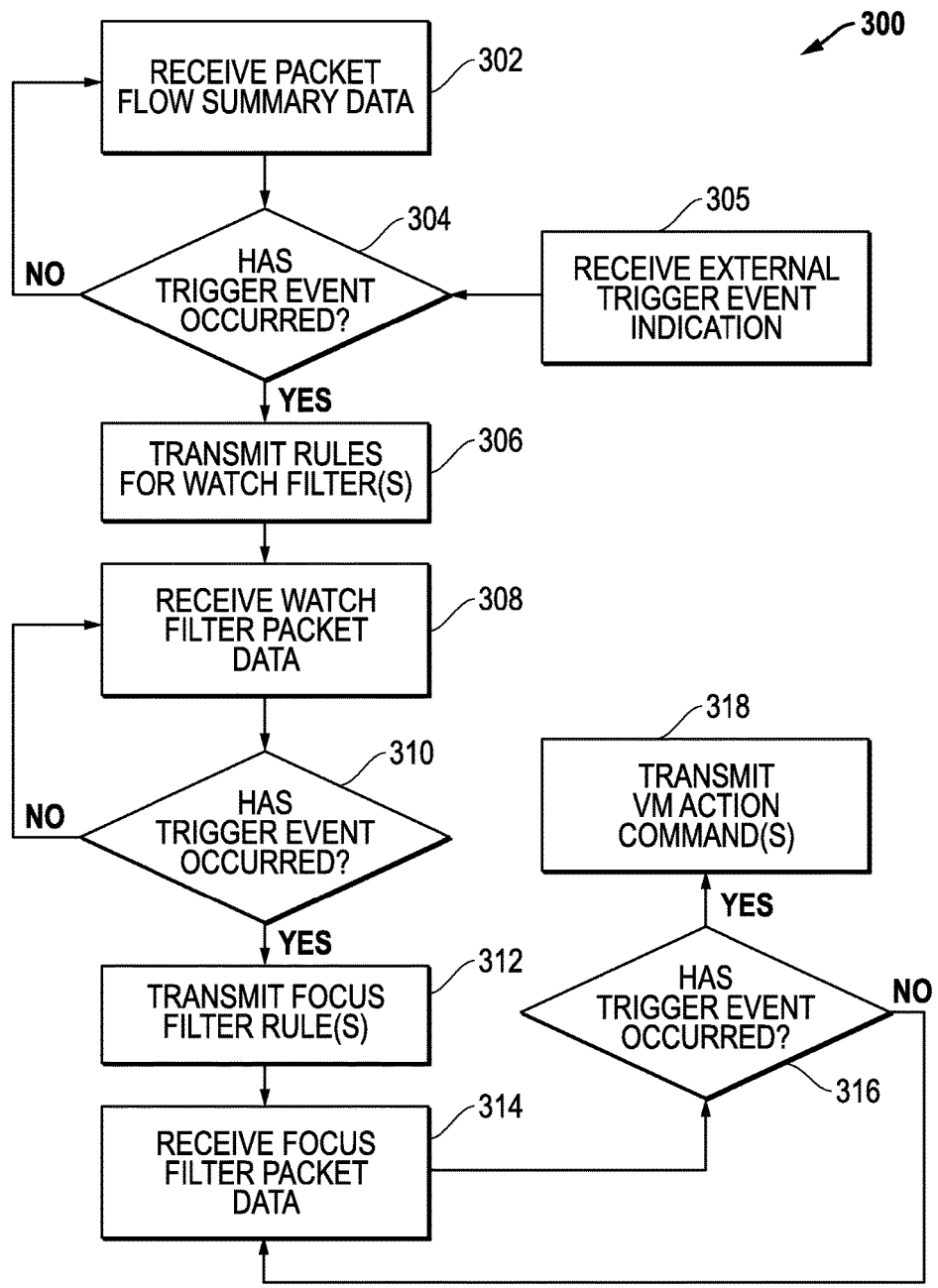
FIG. 3A is a process flow diagram of an example embodiment for a virtual TAP controller to provide on demand packet traffic monitoring for virtual packet processing environments.

FIG. 3A is a process flow diagram of an example embodiment 300 for virtual TAP controller 130 to provide on demand packet traffic monitoring for virtual packet processing environments. In block 302, filter data communications 123 are received for packet flow summary data associated with one or more flow filters 128 from a virtual TAP 120. In block 304, a determination is made whether or not a trigger event has occurred with respect to the packet flow summary data and/or with respect to other external events. If "NO," then flow passes back to block 302. If "YES," then flow passes to block 306 where filter control communications 125 are sent from the virtual TAP controller 130 to the virtual TAP 120 including rules for watch filter(s) to cause the virtual TAP 120 to configure one or more watch filters 124. As described above, an indication of an external trigger event can also be received as represented by block 305, and this external trigger event can also cause the determination in block 304 to be "YES." Next, filter data communications 123 are received in block 308 for packet data associated with the one or more watch filters 124. In block 310, a determination is made whether or not a trigger event has occurred with respect to the watch packet data and/or with respect to other external events. If "NO," then flow passes back to block 308. If "YES," then flow passes to block 312 where filter control communications 125 are sent from the virtual TAP controller 130 to the virtual TAP 120 including focus filter rule(s) to cause the virtual TAP to configure one or more focus filters 126. Next, filter data communications 123 are received in block 314 for packet data associated with the one or more focus filters 126. In block 316, a determination is made whether or not a trigger event has occurred with respect to the focus filter data and/or with respect to other external events. If "NO," then flow passes back to block 314. If "YES," then flow passes to block 318 where VM command communications 127 are sent from the virtual TAP controller 130 to the virtual TAP 120 to cause the virtual TAP 120 to apply one or more VM action commands to the VM platforms 104, 106, ... 108 operating within the virtual processing environment provided by the VM host hardware system 102.

Figure 3B:
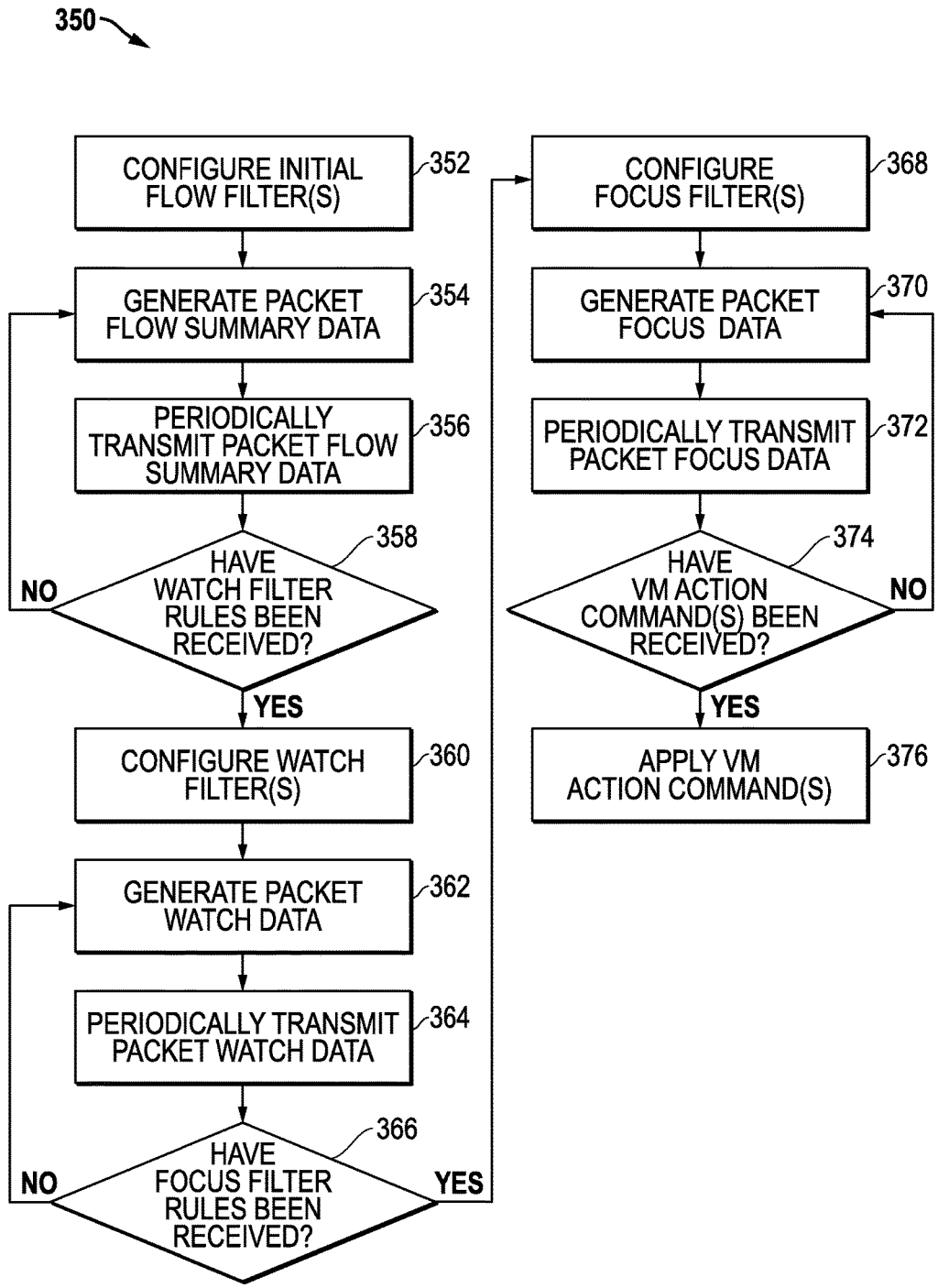
FIG. 3B is a process flow diagram of an example embodiment for a virtual TAP to provide on demand packet traffic monitoring for virtual packet processing environments.

FIG. 3B is a process flow diagram of an example embodiment 350 for virtual TAP 120 to provide on demand packet traffic monitoring for virtual packet processing environments. In block 352, one or more initial flow filters are configured for one or more packet flows within a virtual processing environment. In block 354, packet flow data is generated using the initial flow filters configured for the packet flow traffic. In block 356, the packet flow data is periodically transmitted to the virtual TAP controller 130. In block 358, a determination is made whether watch filter rules have been received from the virtual TAP controller 130, for example, in response to occurrence of a trigger event. If "NO," then flow passes back to block 354. If "YES," then flow passes to block 360 where one or more watch filters are configured based upon the watch filter rules. In block 362, packet watch data is generated using the watch filters. In block 364, the packet watch data is periodically transmitted to the virtual TAP controller 130. In block 366, a determination is made whether focus filter rules have been received from the virtual TAP controller 130, for example, in response to occurrence of a trigger event. If "NO," then flow passes back to block 362. If "YES," then flow passes to block 368 where one or more focus filters are configured based upon the focus filter rules. In block 370, packet focus data is generated using the focus filters. In block 372, the packet focus data is periodically transmitted to the virtual TAP controller 130. In block 366, a determination is made whether one or more VM action commands have been received from the virtual TAP controller 130, for example, in response to a trigger event. If "NO," then flow passes back to block 370. If "YES," then flow passes to block 376 where the VM action commands are applied by the virtual TAP 120 to the VM platforms 104, 106, ... 108 operating within the virtual processing environment provided by the VM host hardware system 102.

Figure 4:
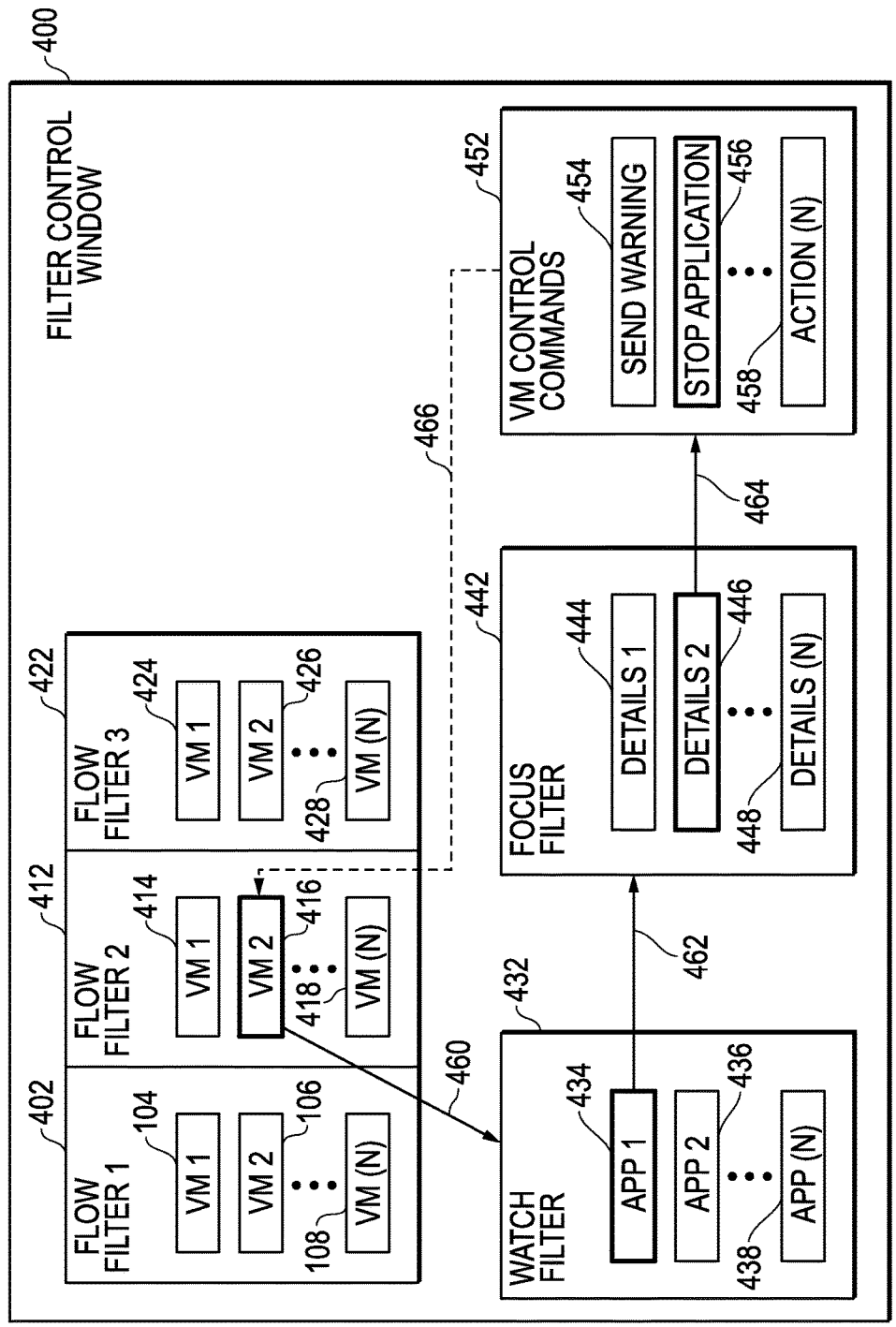
FIG. 4 is a block diagram of an example embodiment for a filter control window that can be displayed as part of a user interface provided through a control panel.

FIG. 4 is a block diagram of an example embodiment for a filter control window 400 that can be displayed as part of the user interface 135 provided through the control panel 136. For this example embodiment 400, three flow filters 402, 412, and 422 have been set up with respect to three different VM host hardware systems and related virtual TAPs. For example, the first flow filter 402 is assumed to be associated with a first VM host hardware system 102 in FIG. 1 and displays packet flow data associated with a plurality of VM platforms (VM1, VM2, VM(N)) 404, 406, ... 408 operating within the first VM host hardware system 102. The second flow filter 412 is assumed to be associated with a second VM host hardware system 142 in FIG. 1 and displays packet flow data associated with a plurality of VM platforms (VM1, VM2, VM(N)) 414, 416, ... 418 operating within the second VM host hardware system 142. The third flow filter 422 is assumed to be associated with a third VM host hardware system 144 and displays packet flow data associated with a plurality of VM platforms (VM1, VM2, VM(N)) 424, 426, ... 428 operating within the third VM host hardware system 144. Although three flow filters 402, 412, and 422 are shown for example embodiment 400, it is understood that different numbers of flow filters can operate and be displayed depending upon the configurations for the overall network environment being monitored.

For the embodiment 400, it is assumed that flow summary data associated with the second VM platform 416 within the second flow filter 412 has caused a trigger event to occur. This packet flow trigger event in turn causes packet traffic associated with the second VM platform (VM2) 416 within the second flow filter 412 to become traffic of interest, and this packet flow trigger event has triggered creation and configuration of a watch filter 432 as represented by arrow 460. As described above, an indication of an external trigger event can also be received that triggers the creation and configuration of a watch filter 432. For example embodiment 400, it is assumed that watch filter 432 has been created and configured to provide additional information concerning a plurality of applications (APP1, APP2, APP(N)) 434, 436, . . . 438 operating within the second VM platform 412. As such, watch filter 432 displays watch filter data associated with these applications (APP1, APP2, APP(N)) 434, 436, . . . 438. Although one watch filter 432 is shown for example embodiment 400, it is understood that different numbers of watch filters can be configured and displayed depending upon the configurations and trigger events for the overall network environment being monitored. It is also again noted that the triggering of the watch filters in response to the packet flow data and/or other external events can also be configured, managed, and/or otherwise controlled through the user management platform 140 and the user interface 135, if desired.

For embodiment 400, it is further assumed that packet watch data associated with the first application (APP1) 434 within the watch filter 432 has caused a trigger event to occur. This watch trigger event in turn further causes traffic associated with the first application 434 to become traffic of further interest, and this watch trigger event has further triggered creation and configuration of a focus filter 442 as represented by arrow 462. For example embodiment 400, it is assumed that focus filter 442 has been created and configured to provide additional detailed information (DETAILS1, DETAILS2, DETAILS(N)) 444, 446, . . . 448 concerning the packet traffic and related functions associated with the first application 434 operating within the second VM platform 416. As such, focus filter 442 displays focus filter data associated with these details (DETAILS1, DETAILS2, DETAILS(N)) 444, 446, . . . 448. Although one focus filter 442 is shown for example embodiment 400, it is understood that different numbers of focus filters can be configured and displayed depending upon the configurations and trigger events for the overall network environment being monitored. It is also again noted that the triggering of the focus filters in response to the packet watch data or other external events can also be configured, managed, and/or otherwise controlled through the user management platform 140 and the user interface 135, if desired.

Finally, for embodiment 400, it is assumed that the second detailed information 446 has caused a trigger event to occur. This focus trigger event in turn further causes traffic associated with the first application 434 to become traffic of particular concern, and this focus trigger event has further triggered one of the VM control commands 452 as represented by arrow 464. For the embodiment depicted, the VM control commands 452 include a first command 454 to send a warning, a second command 456 to stop an application, and other commands up to an Nth command 458. Further, for the embodiment depicted, it is assumed that the focus trigger event has caused the stop application command 456 to be triggered. As represented by dashed arrow 466, VM action command communications 125 would then be sent to the second VM platform (VM2) 416 through a virtual TAP associated with the second VM host hardware system 142 to cause the second VM platform (VM2) 416 to stop the first application (APP1) 434 from operating within the second VM host hardware system 142. Although one VM control command is shown to have been triggered for example embodiment 400, it is understood that different or additional VM control commands can be triggered depending upon the configurations and trigger events for the overall network environment being monitored. It is also again noted that the triggering of the VM action commands in response to the packet focus data and/or other external events can also be configured, managed, and/or otherwise controlled through the user management platform 140 and the user interface 135, if desired.

Figure 5:
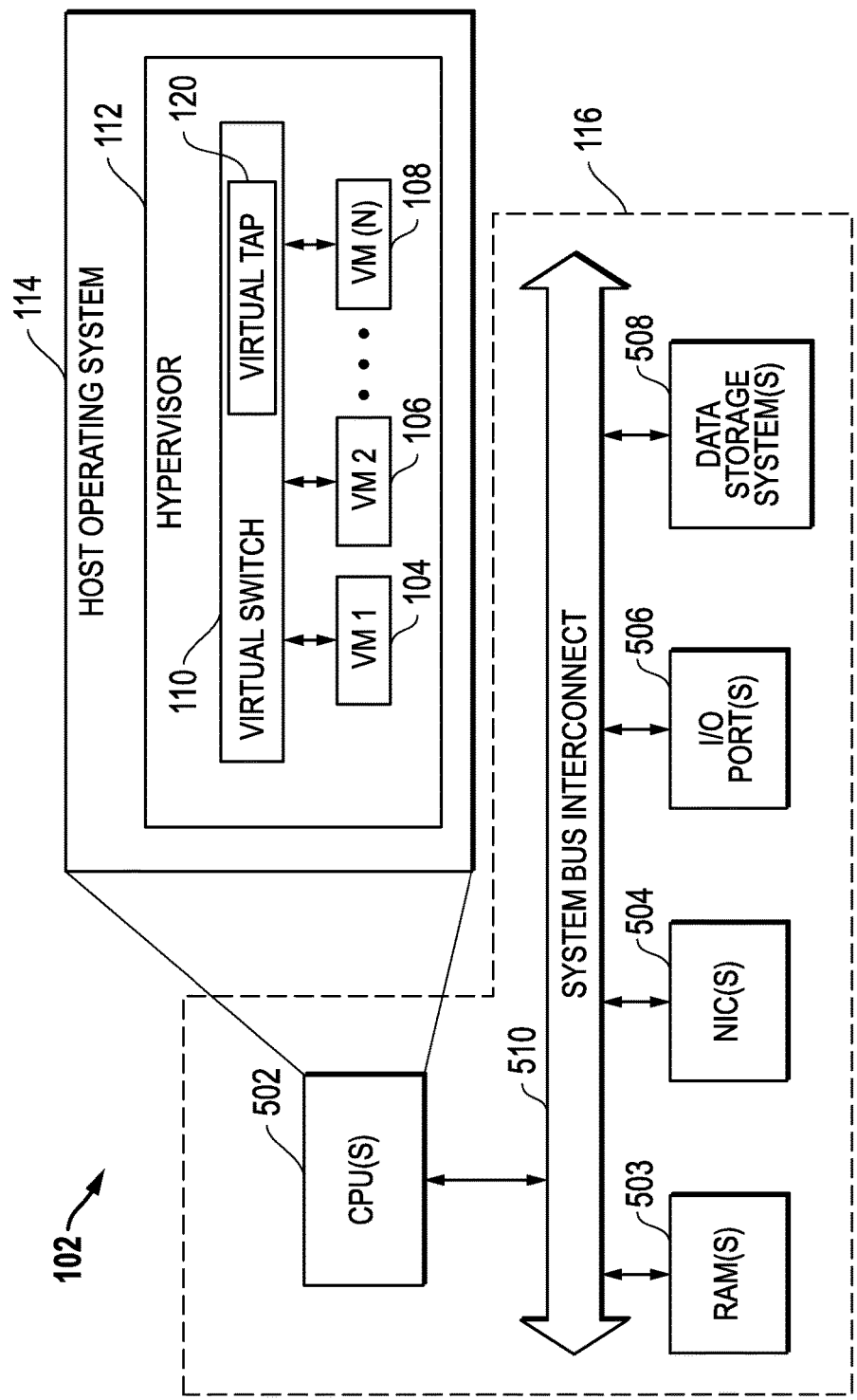
FIG. 5 is a block diagram of an example embodiment for a VM host hardware system.

FIG. 5 is a block diagram of an example embodiment for a VM host hardware system 102. For the example embodiment depicted, the VM host hardware system 102 includes one or more central processing units (CPUs) 502 or other processing devices programmed to provide a virtualization layer or hypervisor 112 including a plurality of virtual machine (VM) platforms 104, 106, . . . 108. The VM host hardware system 102 also includes one or more network interface cards (NICs) 504, one or more input/output (I/O) ports 506, one or more non-volatile data storage systems 508, and one or more random access memories (RAMs) 503 or other volatile memories coupled to communicate with each other through a system bus interconnect 510. In operation, virtualization layer or hypervisor 112 and the VM platforms (VM1, VM2 VM(N)) 104, 106, . . . 108 run on top of a virtual machine (VM) host operating system (OS) 114. For example, the host VM operating system 114, the hypervisor 112, and the VM platforms 104, 106, . . . 108 can be initialized, controlled, and operated by the CPUs or processing devices 502 which load and execute software code and/or programming instructions stored in the data storage systems 508 to perform the functions described herein. As described above, the VM platforms 102, 104, . . . 108 can be configured to perform desired functions including operating as network-based applications within the virtual processing environment to communicate network packets with each other using the virtual switch 110 and/or with an external network communication paths 118 using the virtual switch 110 and the NICs 504. As further described herein, the virtual TAP 120 operates as part of the virtual switch 110 within the hypervisor 112 to monitor packet flows and to obtain copies of network packets being communicated through the virtual switch 110 and to provide the on demand network packet monitoring functions described herein.

It is noted that the functional blocks, systems, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for on demand packet traffic monitoring, comprising:
at an external controller coupled to a network:
receiving packet flow summary data from a plurality of virtual test access ports (TAPs) operating within virtualization layers on host hardware systems coupled to the network, the packet flow summary data being associated with monitored packet flows communicated to virtual machine (VM) platforms operating within the virtualization layers;
monitoring the packet flow summary data to determine occurrence of a first trigger event associated with a first VM platform;
generating watch filter rules in response to an occurrence of the first trigger event; and
transmitting the watch filter rules through the network to a first virtual TAP associated with the first VM platform; and
at the first virtual TAP:
receiving the watch filter rules from the external controller;
using the watch filter rules to configure a watch filter associated with one or more packet flows being communicated with respect to applications running within the first VM platform;
generating watch packet data associated with the applications using the watch filter, the watch packet data including detailed packet traffic statistics for the applications; and
periodically transmitting the watch packet data to the external controller through the network.

2. The method of claim 1, wherein the first trigger event is an event detected from packet flow summary data associated only with the first virtual TAP.

3. The method of claim 1, wherein the first trigger event is further based upon an external event not detected from packet data associated with the one or more packet flows.

4. The method of claim 1, wherein the first trigger event comprises at least one of an indication of a network threat, an indication of a network intrusion, or an indication of a network vulnerability.

5. The method of claim 1, wherein the watch packet data comprises numbers of transmit and receive packets being communicated for the applications.

6. The method of claim 1, further comprising:
at each of the virtual TAPs:
generating packet flow summary data associated with the monitored packet flows; and
periodically transmitting the packet flow summary data to the external controller through the network.

7. The method of claim 6, wherein the packet flow summary data comprises aggregated packet traffic statistics for the monitored packet flows.

8. The method of claim 1, further comprising:
at the external controller:
monitoring the watch packet data from the first virtual TAP to determine when a second trigger event occurs with respect to an application running within the first VM platform based upon the watch packet data;
generating focus filter rules in response to an occurrence of the second trigger event; and
transmitting the focus filter rules to the first virtual TAP through the network; and
at the first virtual TAP:
receiving the focus filter rules from the external controller;
using the focus filters rules to configure a focus filter associated with one or more packet flows for the application associated with the second trigger event;
generating focus packet data using the focus filter, the focus packet data including detailed traffic information associated with the application; and
periodically transmitting the focus packet data to the external controller through the network.

9. The method of claim 8, wherein the focus packet data comprises at least one of packet content data or packet meta data for packets within the one or more packet flows for the application.

10. The method of claim 8, further comprising at the external controller:
monitoring the focus packet data to determine when a third trigger event occurs with respect to the focus packet data;
generating one or more commands associated with the one or more packet flows for the application in response to an occurrence of the third trigger event; and
transmitting the one or more commands to the first virtual TAP.

11. The method of claim 10, wherein the one or more commands comprises a command to terminate operation of the first VM platform.

12. The method of claim 8, further comprising displaying representations of the packet flow summary data, the watch packet data, and the focus packet data through a graphical user interface; and allowing user selection of one or more parameters for the watch filter and the focus filter.

13. The method of claim 1, wherein the external controller comprises at least one of a stand-alone device, a VM platform, or a controller application operating within a VM platform.

14. A system for on demand packet traffic monitoring, comprising:
a plurality of virtual test access ports (TAPs) configured to operate within virtualization layers on host hardware systems coupled to a network;
virtual machine (VM) platforms configured to operate within the virtualization layers; and
an external controller configured to communicate with the plurality of virtual TAPs through the network;
wherein the external controller is further configured to receive packet flow summary data from the plurality of virtual TAPs, the packet flow summary data being associated with monitored packet flows communicated to the VM platforms, and to monitor the packet flow summary data to determine occurrence of a first trigger event associated with a first VM platform;
wherein the external controller is further configured to generate watch filter rules in response to an occurrence of the first trigger event and to transmit the watch filter rules to a first virtual TAP associated with the first VM platform through the network; and wherein the first virtual TAP is configured to receive the watch filter rules from the external controller, to use the watch filter rules to configure a watch filter associated with applications running within the first VM platform, to generate watch packet data associated with the applications using the watch filter, and to periodically transmit the watch packet data to the external controller through the network, the watch packet data includes detailed packet traffic statistics for the applications.

15. The system of claim 14, wherein the first trigger event is an event detected from packet flow summary data associated only with the first virtual TAP.

16. The system of claim 14, wherein the first trigger event is further based upon an external event not detected from packet data associated with the one or more packet flows.

17. The system of claim 14, wherein the first trigger event comprises at least one of an indication of a network threat, an indication of a network intrusion, or an indication of a network vulnerability.

18. The system of claim 14, wherein the watch packet data comprises numbers of transmit and receive packets being communicated for the applications.

19. The system of claim 14, wherein each of the virtual TAPs is further configured to generate packet flow summary data associated with the monitored packet flows and to periodically transmit the packet flow summary data to the external controller through the network.

20. The system of claim 19, wherein the packet flow summary data comprises aggregated packet traffic statistics for the monitored packet flows.

21. The system of claim 14, wherein the external controller is further configured to monitor the watch packet data from the first virtual TAP to determine when a second trigger event occurs with respect to an application running within the first VM platform based upon the watch packet data, to generate focus filter rules in response to an occurrence of the second trigger event, and to transmit the focus filter rules to the first virtual TAP; and wherein the first virtual TAP is further configured to receive the focus filter rules from the external controller, to use the focus filters rules to configure a focus filter associated with one or more packet flows for the application associated with the second trigger event, to generate focus packet data using the second filter, and to periodically transmit the focus packet data to the external controller through the network, the focus packet data including detailed traffic information associated with the application.

22. The system of claim 21, wherein the focus packet data comprises at least one of packet content data or packet meta data for packets within the one or more packet flows for the application.

23. The system of claim 21, wherein the external controller is further configured to monitor the focus packet data to determine when a third trigger event occurs with respect to the focus packet data, to generate one or more commands associated with the one or more packet flows for the application in response to an occurrence of the third trigger event, and to transmit the one or more commands to the first virtual TAP.

24. The system of claim 23, wherein the one or more commands comprises a command to terminate operation the first VM platform.

25. The system of claim 21, wherein the external controller is further configured to display representations of the packet flow data, the first packet data, and the second packet data through a graphical user interface and to allow user selection of one or more parameters for the watch filter and the focus filter.

26. The system of claim 14, wherein the external controller comprises at least one of a stand-alone device, a VM platform, or a controller application operating within a VM platform.

* * * * *